May 22, 1956 G. BIEGERT 2,746,542
PUNCH AND DIE MACHINE FOR PERFORMING BOTH
BLANKING AND TRIMMING OPERATIONS
Filed July 3, 1951 3 Sheets-Sheet 1

INVENTOR
George Biegert
By
Morrison Kennedy Campbell ATTORNEYS

May 22, 1956  G. BIEGERT  2,746,542
PUNCH AND DIE MACHINE FOR PERFORMING BOTH
BLANKING AND TRIMMING OPERATIONS
Filed July 3, 1951  3 Sheets-Sheet 3

INVENTOR
George Biegert
ATTORNEYS

United States Patent Office 2,746,542
Patented May 22, 1956

2,746,542

PUNCH AND DIE MACHINE FOR PERFORMING BOTH BLANKING AND TRIMMING OPERATIONS

George Biegert, Elmhurst, N. Y., assignor to Mergenthaler Linotype Company, a corporation of New York Application July 3, 1951, Serial No. 235,029

7 Claims. (Cl. 164—21)

This invention relates to punch and die machines, and more particularly, to machines of that type which perform blanking and trimming operations on sheet or strip material.

The present invention is herein shown and described in its application to the manufacture of matrices for Linotype machines. In the manufacture of such matrices, strip material is fed intermittently to a punch and die machine where blanks, which resemble the general form of a finished matrix, are produced. The blanks are thereupon transported to and stacked in a second machine where the edges of the blank are trimmed. Thereafter, the blanks are subjected to various other operations which, for present purposes, need not be described.

It is the purpose of this invention to simplify the manufacture of matrices by combining the blanking and trimming operations, that is to say, by making it possible to both blank and trim on the same machine and in a single cycle of operation. The machine is provided with a special two-part die and the blank is initially produced in the die by the passing of a power driven reciprocating punch through the strip material. The further movement of the punch in completing its full stroke within the die serves to perform the trimming operation of the blank. The trimmed blanks are then stacked in line so that they may be removed for the further operations.

As an additional feature of the present invention, the resulting trimmings and chips which remain within the die are removed therefrom by a lifter and pusher mechanism aided by air pressure. In accordance with the present embodiment, the die is provided with an egress or discharge passage for the removal of these trimmings and chips, and a pusher device, controlled from the operation of the strip feeding mechanism, dislodges and removes the trimmings and waste matter from within the die, or at least, failing to completely remove the debris, moves it near enough to the discharge end of the passage so that it may be easily discharged therethrough by a blast of air.

These and other features and improvements will be more fully shown and described in the accompanying drawings and the detailed written description which follows. It should be understood that, although herein illustrated and described in connection with the manufacture of matrices for Linotype machines, the invention is capable of a wider and more general application.

Referring to the drawings.

Figure 1:
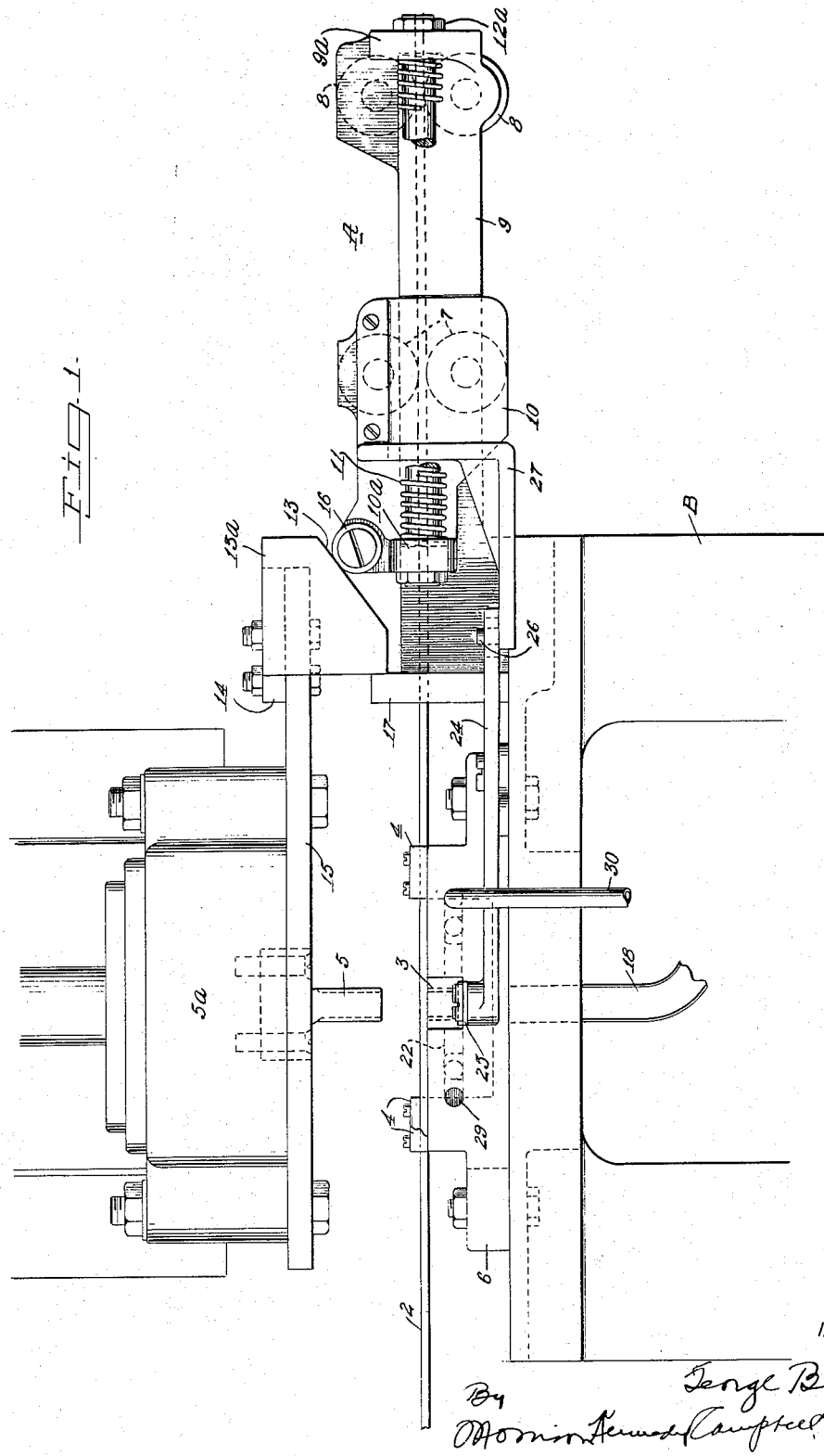
Fig. 1 is a front elevation of a punch and die machine, including a feeding mechanism, with the present invention applied thereto.
Figure 2:
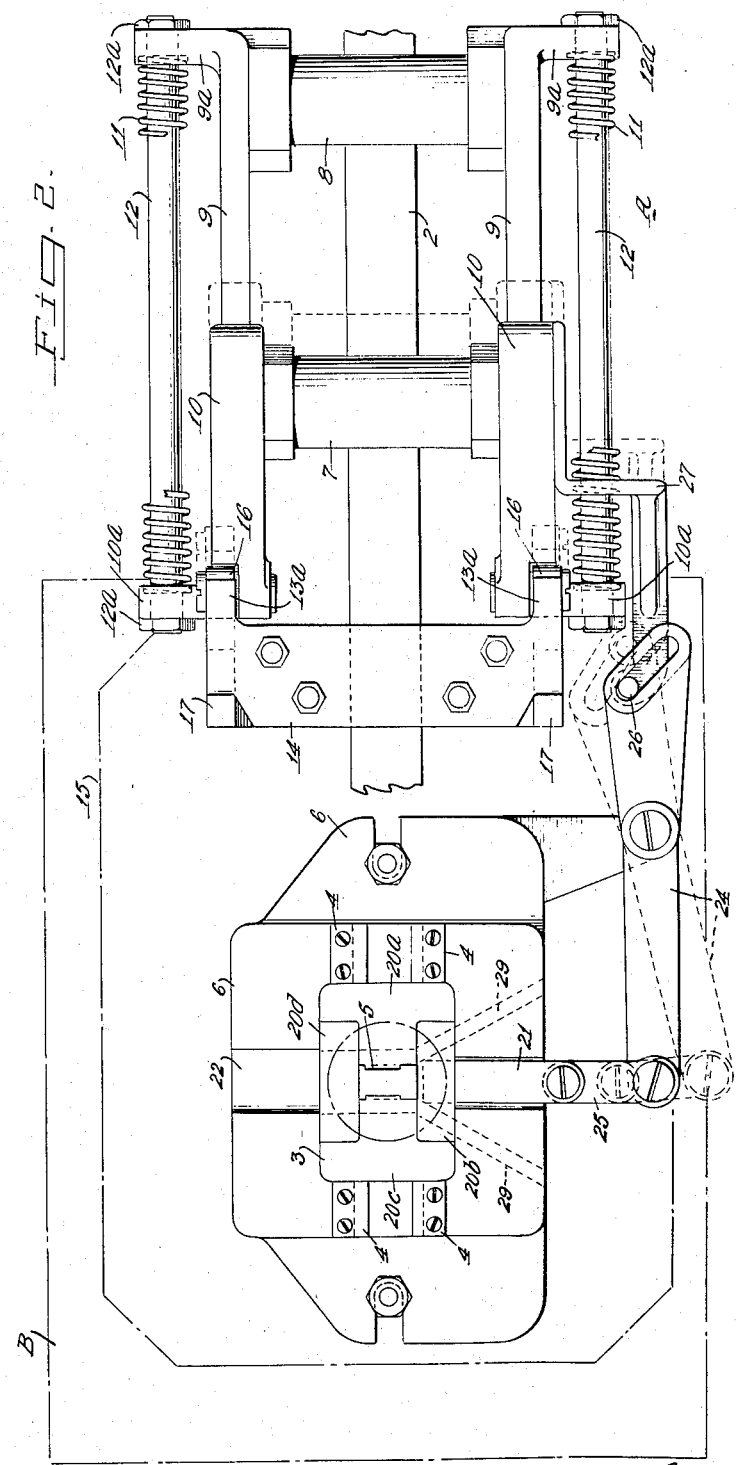
Fig. 2 is a top plan view of the machine shown in Fig. 1.

As best shown in Figs. 1 and 2, strip material 2 is intermittently advanced by a suitable feeding arrangement, designated generally by the reference character A, and guided between a pair of rails 4 to a die 3 and, while positioned over the die, is acted upon by a vertically movable reciprocating punch 5 carried on a power driven ram 5ª. The die is enclosed within a die chase or holder 6 which is securely mounted on the top of a base frame or bed B. The rails 4 are mounted on the die holder.

The feeding arrangement is a standard Dickerman die feed, but any other suitable feeder may be employed to advance the material. A brief description of the feeding arrangement is, however, necessary for a complete understanding of the present invention. The feeding unit A is bolted to and overhangs the base frame B. The strip material 2 passes through two successive pairs of rubber rolls 7, 8. The first encountered rolls 8 are rotatably mounted at opposite ends in fixed horizontal parallel frames 9 but are permitted to revolve only in directions which allow the advance of the material therebetween. The second encountered rolls 7 are the actual feeders and are supported at their opposite ends in reciprocable slides 10, which are movably mounted on the frames 9. The slides 10 may be splined to the frames 9 or they may simply straddle them but, in any event, the parallel frames 9 serve as rails for the movable slides so that they can ride back and forth thereon. The rolls 7, like the rolls 8, are free to rotate only in a direction corresponding to the direction of feed of the material; in other words, when they are being translated by the slides in a rightward direction, as viewed in Figs. 1 and 2, they will be permitted to freely turn, having no effect on the material, but when they are being translated in a leftward direction, being unable to freely turn, they will grip and advance the material.

The leftward or advancing movement of the slides 10 to feed the strip material 2 is accomplished by a pair of compression springs 11, and the rightward or resetting movement of the slides by the descent of the ram 5ª. The springs 11 are supported on axially movable rods 12 which are attached at their left ends to outstanding projections 10ª of the slides 10 and at their right ends are slidably guided in outwardly extending portions 9ª of the frames 9. It is evident, then, that the slides 10 will be normally urged in a leftward direction by the springs 11 and, when the movement of the slides is otherwise unobstructed, they will so travel, permitting the rolls 7 to advance the material. The rods 12 are threaded at their right ends to accommodate the nuts 12ª, and the stroke of the slides 10 and rolls 7 can be regulated by the adjustment of these nuts.

After the slides 10 have been shifted leftwardly by the springs 11 to advance the material 2, as described above, the ram 5ª descends upon the material for the blanking operation. This action of the ram is utilized for returning or resetting the slides 10 and rolls 7 against the action of the springs, preparatory to another feeding operation. Accordingly, the ram 5ª is equipped with a pair of blocks 13ª having cam surfaces 13 adapted to cooperate with anti-friction rollers 16 (see Fig. 1) on the slides 10. The blocks are formed integrally with a bracket 14, and the bracket is connected to the right end of a plate 15, which latter is attached directly to the underside of the ram. As already explained, the rolls 7, although frictionally engaged with the material 2, are permitted to revolve when moving in a rightward direction, but the rolls 8, which permit only the feed of the material, will grip it to prevent any possibility of back feed.

It might be added that a pair of vertical posts 17, upstanding from the base frame B of the machine, serve as guides for the bracket 14 and the blocks 13ª thereof in their upward and downward movements.

The feeding attachment, as thus far described, is standard and forms no part of the present invention, but a general understanding of its operation is helpful, especially in view of the fact that its operation is utilized to control certain of the moving parts of the present invention.

Figure 3:
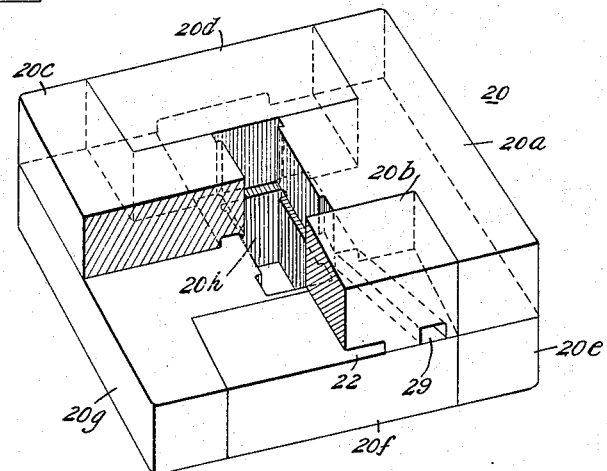
Fig. 3 is a perspective view, partially broken away, of the die unit.
Figure 4:
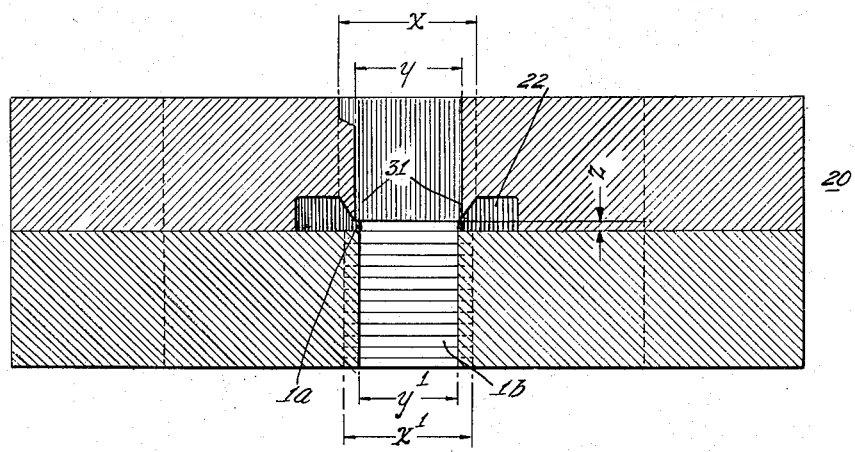
Fig. 4 is a cross sectional view of the die unit with a number of matrices contained therein.

One of the more important elements of the present invention is the die unit, generally designated by the reference numeral 20 and shown in detail in Figs. 3 and 4. Broadly speaking, the die unit consists of upper and lower sections, the upper section containing a die or cavity in the form of the blank to be produced, and the lower section having a die or cavity of the same shape or form, but of slightly lesser dimensions, for example about .006" less around the periphery. The body portion of a Linotype matrix is rectangular in shape, but the end portions have outwardly extending "ears" and "toes." The shape of the matrices can be envisaged from Fig. 5 which shows the strip material 2 with the blank openings 1. The dimensions $x$ and $y$ in Fig. 4 represent the widths of the die of the upper section corresponding to the widths of the body portions and end portions, respectively, of the blanks; and the dimensions $x^1$ and $y^1$ represent the corresponding die widths of the lower section. The punch 5 has its periphery conforming in shape and dimensions to the internal periphery of the upper die section, so that it fits in the upper die section with a snug slide fit but is too large to fit into the lower die section.

The die unit 20 is preferably made up of eight co-fitting parts, the upper blanking section thereof consisting of four parts 20ª, 20ᵇ, 20ᶜ, 20ᵈ, and the lower trimming section consisting of four parts 20ᵉ, 20ᶠ, 20ᵍ, 20ʰ (see Fig. 3). In the event of damage to the die unit, it is thus necessary to replace only the parts actually damaged. For present purposes, however, the die unit 20 can be considered as a single integral unit.

Figure 5:
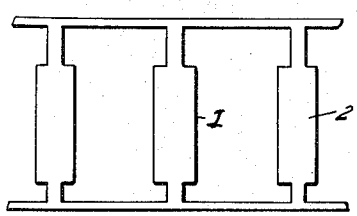
Fig. 5 is a top view illustrating the strip material with the blanks removed.
Figure 6:
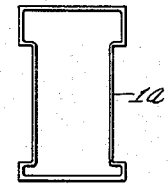
Fig. 6 is a top view illustrating the waste trimmings which are formed within the die.

In operation, the punch 5 descends upon the strip material 2 and, as it passes through the material and enters the upper die section, forms a blank therein, as in Fig. 5. The blank is forced through the upper die section by the continued downward movement of the punch and thence into the lower die section before the punch reaches the limit of its downward stroke. The punch never actually enters the lower die section but travels within a few thousandths of an inch thereof, sufficient to force the blank into the lower die section. The blank, in being so forced, is trimmed, that is to say, its outer periphery 1ª (see Fig. 6) is removed by virtue of the reduced dimensions of the lower die section.

Since the punch does not enter the lower die section, the trimmed blanks depend for their movement therethrough upon displacement by subsequently trimmed blanks. To facilitate this displacement, the discharge end of the lower die section is slightly tapered outwardly near the bottom to permit the trimmed blanks, designated 1ᵇ in Fig. 4, to more easily pass or fall into the discharge channel 18 (see Fig. 1).

Since the blanks are trimmed between the upper and lower sections of the die unit, trimmings 1ª (Fig. 6) and chips will tend to accumulate within the die unit proper. To prevent such accumulation, the bottom of the upper die section (see Fig. 4) is provided with a slot 22 which serves as a guideway for a movable push bar 21 (see Fig. 1) which is adapted to travel therein, loosening the chips and trimmed matter and either removing them altogether through the back or discharge end of the slot 22 or, at least, near enough thereto to be removed by air pressure. The slot 22 also serves to afford clearance for the trimmings 1ª during the trimming operations.

The operation of the bar 21 is controlled from the strip feeder A. As the ram 5ª rises, permitting the spring operated slides 10 and gripper rolls 7 to advance the material, the bar 21 is directed through the slot 22 and across the top of the lower die section to remove any debris. The bar 21 is connected to a more or less centrally pivoted lever 24 by means of a short link 25 pivotally connected at one end to the bar 21 and at the other end to the lever 24. The lever 24 is pivotally mounted on, but slightly raised above, the top of the base frame B. The other end of the lever 24 is provided with an elongated angular disposed slot which accommodates a pin 26 of a bent arm 27, and the arm 27 is connected to one of the slides 10, so that when said slide is moving leftwardly in feeding the strip material, the pin 26, by cam action within said angular slot, functions to pivot the lever 24 in a clockwise direction to operate the bar 21. Similarly, the bar 21 is returned to inoperative position (the position indicated by the dotted lines in Fig. 2) during the rightward movement of the slide 10.

As stated, air pressure supplements the action of the pusher bar 21 and aids in the removal of the debris through the discharge end of the slot 22. The air pressure may be time controlled and supplied in the form of a blast, or it may be supplied continuously so that time control is unnecessary. In any event, it is supplied by air hoses 30 and through ports 29 at the front of the die unit. The ports, in effect, are tributaries of the slot 22 and converge into the slot at angles from opposite sides.

It is important that each blank, in traveling from the upper to the lower die section, be given a certain amount of guidance so that it will be properly aligned with respect to the lower die for even trimming. For this reason, the side walls of the upper die section, which engage the body portions of the blanks, are formed with downwardly depending projections 31 (Fig. 4) which serve to prevent the blanks from sliding or shifting edgewise within the slot 22. The distance $z$ in Fig. 4 indicates the space between the bottom tips of the projections 31 and the top of the lower die, and this distance should always be less than the thickness of the blanks to be trimmed.

As a matter of incidental interest, it may be pointed out that during the upstroke of the ram 5ª, the punch 5 is removed from the die and the strip material 2 so that the latter may again be advanced by the feeding unit A. During this upward movement of the punch through the material, the material is prevented from adhering to the punch by the parallel guide rails 4 which act to maintain the material in close proximity to the die.

The invention has been shown and described in preferred form, but obviously many variations and modifications may be made therein and in its mode of application which will still be comprised within its spirit. It is to be understood, therefore, that the invention is not to be limited to any specific form or embodiment, except insofar as such limitations are specified in the appended claims.

What is claimed is:

1. In a punch and die machine for performing both blanking and trimming operations, the combination of a die unit comprising an upper blank forming cavity and a lower blank trimming cavity, said cavities being in axial alignment and of the same cross-sectional shape but the dimensions of the lower blank trimming cavity being slightly less than the dimensions of the upper blank forming cavity, means for intermittently feeding the material to the die unit, and a power driven punch common to both cavities, said punch peripherally conforming in shape to the upper blank forming cavity and being peripherally dimensioned to extend into the upper blank forming cavity with a snug slide fit but being too large to fit into the lower blank trimming cavity, said punch being movable downwardly into the upper blank forming cavity just short of the lower blank trimming cavity to cut a blank from the material and force it into the lower cavity for trimming.

2. A combination according to claim 1, wherein the upper and lower die cavities form a continuous passage through the die unit, said passages permitting the trimmed blanks to be discharged from the bottom of the die unit.

3. A combination according to claim 1, wherein the die unit is formed with a discharge slot for chips and trimmings, said slot passing longitudinally through the die unit in the region of juncture of the two die cavities and being wider than said cavities.

4. A combination according to claim 3, including an automatic pusher bar operable within said discharge slot for removing the debris therefrom.

5. A combination according to claim 3, including an automatic pusher bar operable within said discharge slot for removing the debris therefrom, and means controlled by the material feeding means for operating the pusher bar in timed relation thereto.

6. A combination according to claim 3, including air ports leading into the discharge slot for removing the debris therefrom.

7. A combination according to claim 3, wherein the walls of the upper die cavity extend downwardly and partly across said discharge slot to guide the blanks past the slot into the lower die cavity.

References Cited in the file of this patent

UNITED STATES PATENTS

| | | |
|---|---|---|
| 368,133 | Cowles | Aug. 9, 1887 |
| 503,966 | Higgins | Aug. 29, 1893 |
| 521,793 | Heys | June 26, 1894 |
| 2,313,525 | Edelman | Mar. 9, 1943 |
| 2,342,049 | Holmbeck | Feb. 15, 1944 |
| 2,361,687 | Hermani | Oct. 31, 1944 |